US012001487B2

United States Patent
Wonus et al.

(10) Patent No.: US 12,001,487 B2
(45) Date of Patent: Jun. 4, 2024

(54) MULTI-MODEL ENRICHMENT MEMORY AND CATALOG FOR BETTER SEARCH RECALL WITH GRANULAR PROVENANCE AND LINEAGE

(71) Applicant: Microsoft Technology Licensing, LLC, Redmond, WA (US)

(72) Inventors: Kevin Corley Wonus, Haymarket, VA (US); Chelsea Ann Villanueva, Woodinville, WA (US); Samuel Robert Lester, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 17/849,444

(22) Filed: Jun. 24, 2022

(65) Prior Publication Data

US 2023/0418878 A1 Dec. 28, 2023

(51) Int. Cl.
*G06F 16/906* (2019.01)
*G06F 16/901* (2019.01)
*G06F 16/903* (2019.01)

(52) U.S. Cl.
CPC ........ *G06F 16/906* (2019.01); *G06F 16/9024* (2019.01); *G06F 16/90335* (2019.01)

(58) Field of Classification Search
CPC ............. G06F 16/906; G06F 16/90335; G06F 16/9024; G06F 40/30; G06F 16/90332;

(Continued)

(56) References Cited

U.S. PATENT DOCUMENTS

2007/0198564 A1\* 8/2007 Blackstone ............ G16H 10/60
2009/0132233 A1\* 5/2009 Etzioni ............... G06F 16/3332
707/E17.073

(Continued)

OTHER PUBLICATIONS

"Altair® Monarch®", Retrieved from: https://web.archive.org/web/20211212114028/https://www.altair.com/monarch/, Dec. 12, 2021, 8 Pages.

(Continued)

*Primary Examiner* — Evan Aspinwall
(74) *Attorney, Agent, or Firm* — Weaver IP L.L.C.

(57) ABSTRACT

A multi-model data store comprises an enrichment catalog and an enrichment memory graph. Raw data from a source raw datastore is enriched based on an enrichment function. Enriched data is stored in graph nodes with edge associations indicating the enrichment type and confidence level. The enriched data is also stored in the enrichment catalog with full breadcrumb provenance and lineage identifying, with cataloged enrichment steps, down to a record and field in the source raw datastore. Additional enriched values and associations between graph nodes can be entered in the graph by a user. Queries to the multi-model database begin in the graph and continue to the enrichment catalog. Query results include the full sequential chain of enrichments to source raw data records and fields, and may include dynamically generated virtual enrichment catalog records that link search values not found in the enrichment catalog to enrichment catalog records via the graph.

20 Claims, 8 Drawing Sheets

(58) Field of Classification Search
CPC ........... G06F 16/24534; G06F 16/3335; G06F 16/2282; G06F 16/258; G06F 40/284; G06F 16/9535; G06F 16/907; G06F 2221/2111; G06F 40/151; G06F 40/169; G06F 40/174; G06F 40/247; G06F 40/295; G06F 40/40; G06F 40/56; G06N 5/01; G06N 5/022; G06N 5/04; G06N 5/046
USPC ................ 707/740, 822, 755, 759, 756, 722
See application file for complete search history.

(56) References Cited

U.S. PATENT DOCUMENTS

| | | | |
|---|---|---|---|
| 2018/0129715 A1* | 5/2018 | Standefer, III | G06F 16/24575 |
| 2018/0260442 A1* | 9/2018 | Vaidhyanathan | G06F 16/285 |
| 2019/0243865 A1* | 8/2019 | Rausch | G06F 16/907 |
| 2020/0026790 A1* | 1/2020 | MacLean | G06F 16/2282 |
| 2021/0406254 A1 | 12/2021 | Friedman et al. | |

OTHER PUBLICATIONS

"Derived Tables in Looker", Retrieved from: https://docs.looker.com/data-modeling/learning-lookml/derived-tables?_ga=2.199654766.1152215217.1648147609-1498468832.1648147609#incrementally_building_pdts, Retrieved Date: Mar. 25, 2022, 28 Pages.

"Foundry", Retrieved from: https://web.archive.org/web/20220309140401/https://www.palantir.com/platforms/foundry/, Mar. 9, 2022, 7 Pages.

Aleksic, et al., "Introducing Looker Incremental PDTs: Benefits and Use Cases", Retrieved from: https://cloud.google.com/blog/products/data-analytics/incremental-pdts?_ga=2.157686394.1152215217.1648147609-1498468832.1648147609, Jun. 30, 2021, 5 Pages.

McKenzie, et al., "The Full 'Putin List' of Russian Oligarchs and Political Figures Released by the US Treasury", Retrieved from: https://edition.cnn.com/2018/01/30/politics/full-us-list-of-russian-oligarchs-with-putin-ties-intl/index.html, Jan. 30, 2018, 8 Pages.

"International Search Report and Written Opinion issued in PCT Application No. PCT/US23/022450", dated Aug. 25, 2023, 12 Pages.

* cited by examiner

MULTI-MODEL ENRICHMENT MEMORY AND CATALOG FOR BETTER SEARCH RECALL WITH GRANULAR PROVENANCE AND LINEAGE

BACKGROUND

Data analytics may involve systematic computational analysis of collected or enriched data. Many fields, such as marketing, management, finance, software services, security information, and security event management may utilize data analytics for the discovery, interpretation, and communication of meaningful patterns in data. Data analytics also entails applying data patterns toward decision-making. Provenance and lineage may include historical records around the origins and line of descent of data. In data analytics, provenance and lineage provides a foundation for assessing authenticity and enabling trust in data.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are disclosed for a multi-model enrichment memory and catalog providing better search recall with granular provenance and lineage.

In one implementation, provenance and lineage are maintained across a persistent multi-model datastore with uniform representation of enrichments. A first raw data value is received from a source raw datastore and a first enrichment type is received for the first raw data value. An enrichment memory graph of the persistent multi-model datastore is queried for a data value matching the first raw data value and having an association to the first enrichment type in the enrichment memory graph. In response to determining that a data value matching the first raw data value and having an association to the first enrichment type is not registered in the enrichment memory graph, a first enriched data value is generated by executing an enrichment function of the first enrichment type on the first raw data value. A node for the first raw data value and a node for the first enriched data value are registered in the enrichment memory graph. An edge relationship is created between the first raw data value node and the first enriched data value node in the enrichment memory graph based on the first enrichment type. A first enrichment catalog record is built in an enrichment catalog that is stored in the persistent multi-model datastore and includes the first enriched data value, an identifier of the enrichment function of the first enrichment type, and a respective identifier for each of a source collection, a first source record, and a first source field storing the first raw data value in the source raw datastore.

In a further aspect, an initial search value is received in a query for generating query results from the persistent multi-model datastore. An enrichment memory graph node having a value matching the initial search value is identified. A set of enrichment memory graph node values is identified, which includes at least the enrichment memory graph node value matching the initial search value and any enrichment memory graph node value having an edge relationship or an inferred edge relationship to the matching enrichment memory graph node value. The enrichment catalog is searched for each enrichment memory graph node value of the set of enrichment memory graph node values. In response to finding a first enrichment catalog value matching a first enrichment memory graph node value of the set of enrichment memory graph node values, a first virtual enrichment catalog record is dynamically built to include the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value. A query result is returned including a full sequential chain of enrichments that comprises at least a representation of the first virtual enrichment catalog record and a representation of the third enrichment catalog record comprising the first matching enrichment catalog value. The third enrichment catalog record in the query result includes a full sequential chain of enrichments to a first source raw data record and a first source raw data field corresponding to the first matching enrichment catalog value.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
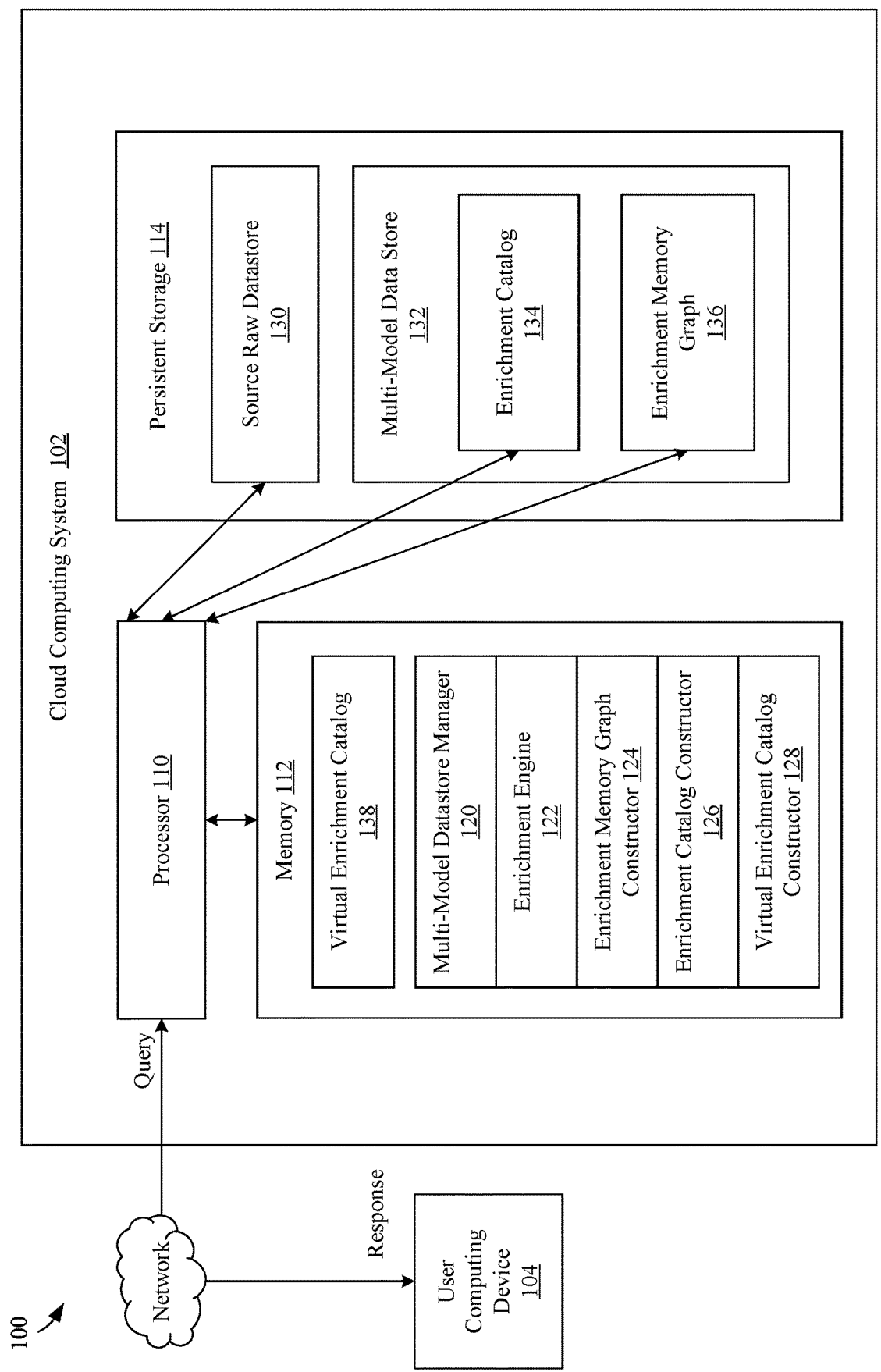
FIG. 1 is block diagram of a system including an example multi-model enrichment memory graph and enrichment catalog that maintains granular provenance and lineage to source data, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on." If the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Raw datasets may be processed to produce enrichments comprising transformed data. The enrichments (i.e., data enriched with further information) may then be used by data analysts, for example, to draw conclusions. There are many types of data transformations that produce enrichments. For example, a data transformation may include deriving citizenship data from place of birth data, mapping Internet protocol (IP) address data to geolocation data, deriving country of origin data or profession data from Arabic laqab data, or translating term data or name data from a first human language to equivalent term data or name data in a second human language. With enrichments generated from raw data, analysts would also like to have provenance and lineage of the enriched data and an ability to distinguish enrichments from raw data. As described above, provenance and lineage in data analytics provides a foundation for assessing authenticity and enabling trust in data.

In systems and methods described herein, an enrichment memory (EM) graph is provided to augment an enrichment catalog (EC). The combination thereof produces an indexable multi-model datastore. Full provenance and lineage representation is provided with individual datum granularity. Queries into the enrichment memory graph facilitate finding items in the enrichment catalog that would be matches, and therefore improve recall. In query responses, values with full provenance and lineage returned from the enrichment catalog are appended to virtual transformed values (e.g., volatile enrichment representations) derived from the enrichment memory graph with additional provenance and lineage. Regardless of what type of result is returned (e.g., virtual and/or actual enrichment catalog entry), the query result is uniform. Thus, the multi-model nature of the implementation does not unnecessarily communicate the complexity of a multi-model index to the requestor. The described multi-model datastore can augment an existing data catalog or operate standalone. In either case, the multi-model datastore provides a provenance and lineage history for every registered enrichment. Moreover, it can improve and expand search recall by leveraging previously registered enrichments in the enrichment memory graph, as described below. As high-fidelity provenance and lineage is not a fundamental component of most data storage systems, data enrichment processing creates a problem of opacity for data analysts that demand an accurate account of every data transformation on every datum. An enrichment-aware system that provides full visibility of provenance and lineage, while also providing comprehensive search resolution, is a current gap for today's data storage systems.

An enrichment catalog may store data that is enriched or transformed from raw data received from a raw datastore, and along with an enrichment memory graph, comprises the multi-model datastore. Each record in the enrichment catalog comprises an enriched datum and an association back to its raw data input(s), to provide full 'bread-crumb' representation of what created the enriched datum including an enrichment function that transformed the raw data. A search in the enrichment memory graph comprises a first pass when querying the enrichment catalog. All terms or enrichments registered in the enrichment memory graph that are associated with the original search term are retrieved before querying the enrichment catalog. The improved recall imparted by the use of the enrichment memory graph can account for an improved number of hits for an enrichment query, which may provide benefits with respect to an analysts internal metrics, benchmarks, and/or quality gates.

The disclosed multi-model system may be employed and grown over time as raw data is received from a raw datastore, queries are received, and enrichment query results are delivered to an analyst's computing device. As enrichment processing occurs over time and the enrichment catalog is grown, the enrichment memory is also being updated with maintained provenance and lineage details.

The enrichment memory graph may be configurable by a user (e.g., an analyst). In this regard, human expertise may be utilized to associate corresponding node values of the enrichment memory graph (e.g., search terms), making the multi-model datastore customizable and flexible for an analysts workload. Improving data recall is helpful to an analyst as one could potentially receive millions of documents in a query response that are 'relevant' to their purpose. By customizing the enrichment memory graph for a user and querying the enrichment catalog with additional search terms provided by the enrichment memory graph, the received pool of data may shrink to only useful records. Utilizing machine learning algorithms to associate search terms may involve use of excessive resources (i.e., costs) to train the data. However, such resources are not needed for the enrichment memory graph model. In comparison, configuring or updating the enrichment memory graph based on user input and human expertise can be less costly and more effective than using machine learning methods.

Although implementing the multi-model datastore with the persisted enrichment catalog and persisted enrichment memory graph may impose some additional overhead (e.g., compute time, storage space, and compute resources), in comparison to on-demand enrichment functions, there are significant benefits to this solution. For example, the disclosed multi-model datastore solution provides fast indexed-read operations and reduced compute-time for downstream enrichments and correlation. In this regard, failing to persist enrichments may be excessively compute-intensive, with compute-time compounded to every downstream operation.

Once the enrichment catalog and enrichment memory graph are persisted, hashing to raw data and provenance and lineage representation is an O(1) lookup. Moreover, a desirable side-effect of utilizing the enrichment memory graph is improved compute-time by hashing enrichments with like-inputs, and making these enrichments searchable on records that produce matches within the enrichment memory graph.

Prior to performing an enrichment on raw data, a query to the enrichment memory graph is executed for the same raw data inputs and the answer may be effectively "looked-up." This technique may mitigate redundant compute time. Finally, separating enriched data and raw data, as described herein, provides transparency. Unfortunately, often in the field, analysts don't know which data has truly been collected (raw data) and which data has been enriched or transformed.

Overall, the methods and systems described herein provide various improvements, including search recall, reduce compute cycles by eliminating enrichment redundancy, and provide analysts with relevant provenance and lineage.

As described above, the multi-model datastore may include a persisted enrichment catalog and a persisted enrichment memory graph. For instance, FIG. 1 is block diagram of a system 100 including an example multi-model enrichment memory graph and enrichment catalog that maintains granular provenance and lineage to source data, according to an example embodiment. As shown in FIG. 1, system 100 includes a cloud system 102 and a user computing device 104. Cloud computing system 102 comprises an electronic processor 110, a memory device 112, and persistent storage 114. Memory device 112 comprises a virtual enrichment catalog 138, a multi-model datastore manager 120, an enrichment engine 122, an enrichment memory graph constructor 124, an enrichment catalog constructor 126, and a virtual enrichment catalog constructor 128. Persistent storage 114 includes a source raw datastore 130 and a multi-model datastore 132. Multi-model datastore 132 comprises an enrichment catalog 134 and an enrichment memory graph 136.

Cloud computing refers to the availability of computer system resources, especially data storage (e.g., cloud storage) and computing power, without direct active management by the user. As such, cloud computing system 102 may comprise computer system resources such processor 110, memory device 112, and persistent storage 114 that may provide services via a network (e.g., the internet) to user computing device 104. For example, system 100 may be distributed over multiple servers and/or storage devices in cloud system 102. Alternatively, or in addition, electronic processor 110 and memory device 112 may be implemented in a single computing device (e.g., user computing device 104) with local and/or remote persistent storage 114. Processor 110 may be configured to receive queries and/or configuration parameter values (e.g., for configuring enrichment memory graph 136) that is input by a user at user computing device 104, and transmit query responses to computing device 104.

Computing device 104 may be configured to run one or more applications that may interact with processor 110 and/or multi-model datastore 132. Computing device 104 may comprise any type of computing device and/or communication device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation), or a desktop computer or PC (personal computer).

Electronic processor 110 may include any number of processors that may comprise a central processing unit (CPU), microprocessor, multi-processors, processing cores, and/or any other suitable hardware-based processor types described herein or otherwise known.

Memory device 112 may include one or more of any suitable type of a memory device, for example, a RAM (random access memory) device. Persistent storage 114 may comprise any suitable type of physical storage mechanism, for example, a magnetic disc (e.g., in a hard disk drive), an optical disc (e.g., in an optical disk drive), a solid-state drive (SSD), a ROM (read only memory) device, etc., and/or any other suitable type of physical, hardware-based storage medium.

Figure 2:
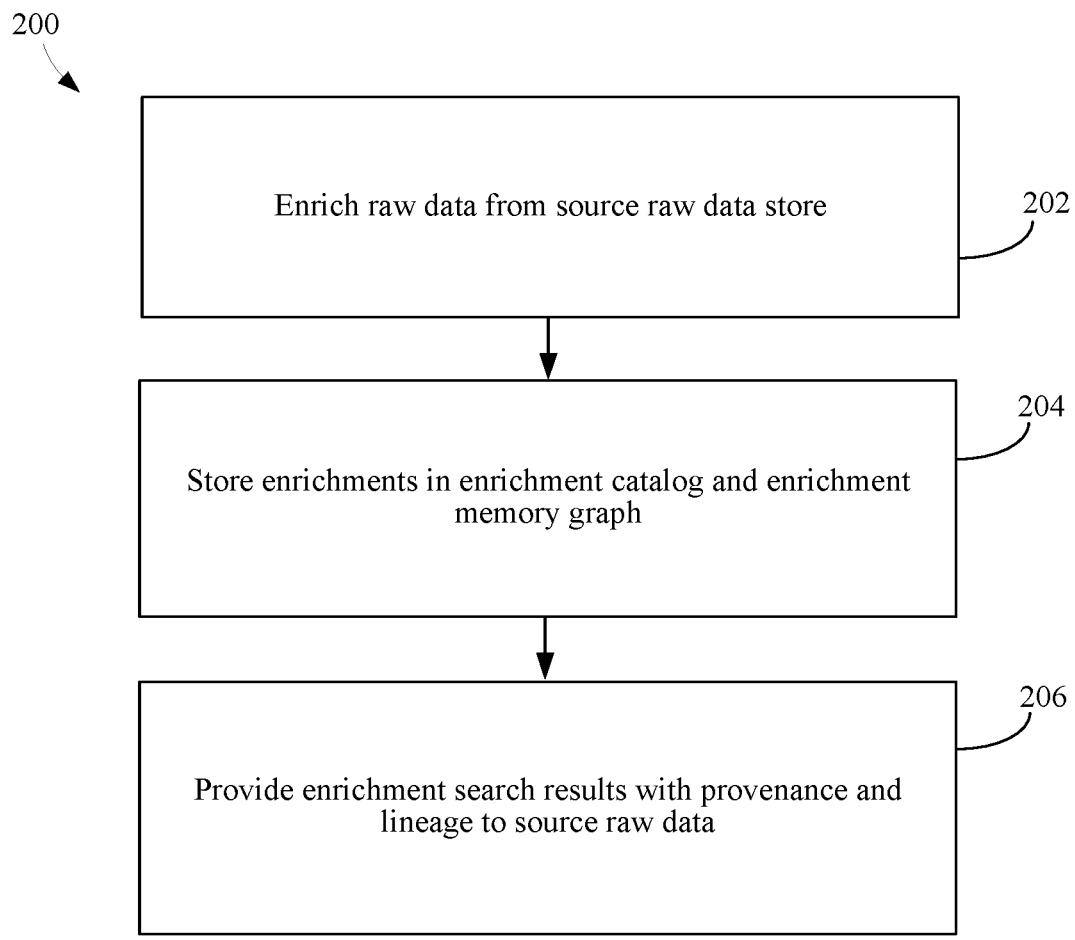
FIG. 2 is a flowchart of a high-level method for populating an enrichment catalog and an enrichment memory graph utilizing enrichment processes, and responding to queries with full provenance and lineage representation, according to an example embodiment.

Source raw datastore 130, enrichment catalog 134, and enrichment memory graph 136 comprise three main components that are utilized for storing and retrieving enrichments. For instance, FIG. 2 is a flowchart 200 of a high-level method for populating an enrichment catalog and an enrichment memory graph utilizing enrichment processes and responding to queries with full provenance and lineage representation, according to an example embodiment. Flowchart 200 may be implemented in system 100. For purposes of illustration, flowchart 200 is described with reference to FIG. 1. Other structural and operational embodiments will be apparent to persons skilled in the relevant art(s) based on the following discussion regarding flowchart 200.

Flowchart 200 begins with step 202. In step 202, raw data from a source raw datastore is enriched. For example, multi-model datastore manager 120 may be configured to collect data (e.g., receive data) and store the collected data in source raw datastore 130 as raw data values. Raw datastore 130 may comprise records and fields of data (e.g., in a tabular format). However, the disclosure is not limited to any specific method for collecting raw data or any specific structure for organizing raw data in raw datastore 130, and any suitable structure may be utilized. In some embodiments, the raw data may be organized based on collections with collection identifiers. Enrichment engine 122 is configured to enrich (e.g., transform) the raw data utilizing any of various enrichment functions. The enrichment functions (e.g., data transformation processes) are not limited to term or name translations or transliterations and may include any suitable type of transformation of data including from numerical data to character based data and vice versa. As described above, examples include deriving citizenship data from place of birth data, mapping IP address data to geolocation data, deriving country of origin data or profession data from Arabic laqab data, or translating term data or name data from a first human language to equivalent term data or name data in a second human language.

In step 204, enrichments are stored in the enrichment catalog and the enrichment memory graph. For example, enrichment catalog constructor 126 is configured to store the resulting enrichments in enrichment catalog 134 with information about the original source raw data value. Enrichment catalog 134 may comprise records and fields of data. For example, enrichment catalog 134 may comprise a tabular format. However, the disclosure is not limited to any specific structure for the enrichment catalog and any suitable structure may be utilized. Raw data information is segregated or distinguished from the enriched data values. Each enrichment catalog 134 entry or record may comprise an enriched data value and a breadcrumb trail of provenance and lineage reaching back to the source raw data value in source raw datastore 130 that was an input value to a corresponding enrichment function. For example, in addition to data identified as the enrichment result, an enrichment catalog 134 entry may identify the source raw data collection, a record storing the source raw data value in source raw datastore 130, an enrichment function utilized to generate the enrichment using the source raw data value as an input, and a field identifier for the source raw data value.

Moreover, enrichment memory graph constructor 124 may be configured to store an enrichment result in enrichment memory graph 136 with information about the type of enrichment that was performed on the source raw data value. For example, an enriched data value may be stored as a first node in enrichment memory graph 136 and may be associated with an edge relationship that may indicate the type of enrichment function or process that was executed to generate the enriched data value from the raw data value. The first node may be associated with a second node based on the edge relationship. For example, the enriched data value of the first node may be a term represented in the English language and the edge relationship may indicate that the enrichment type was translation from Russian to English. The edge relationship may connect or be associated with a second node in enrichment memory graph 136 that comprises a Russian language version of the enriched data value (English language term) stored in the first node.

Edge relationships between nodes in enrichment memory graph 136 may be unidirectional or bidirectional. Example unidirectional relationships may comprise:

Place of Birth: Maryland →nationality: USA
TCP/IP address: 200.100.10.7→geographical location: Vienna, VA The first unidirectional relationship indicates that nationality may be an enrichment based on a particular place of birth but not vice versa. The second unidirectional relationship indicates that geographical location may be an enrichment based on a transmission control protocol (TCP)/IP address but not vice versa.

Example bidirectional relationships may comprise:
Bill Clinton←--Билл Клинтон

比尔·克林顿 ←—→Bill Clinton

The first bidirectional relationship indicates that Bill Clinton may be an enrichment based оf Билл Клинтон , and Билл Клинтон may be an enrichment based on Bill Clinton. The second bidirectional relationship indicates that 比尔·克林顿 may be an enrichment based on a Bill Clinton and Bill Clinton may be an enrichment based on 比尔·克林顿. In some embodiments, a relationship may include a probability for whether an enrichment is correct. For example, there may be a 95% confidence level indicated in an edge relationship between a graph nodes storing Билл Клинтон and Bill Clinton for Билл Клинтон being a Russian translation of Bill Clinton. Also, there may be a 81% confidence level indicated in an edge relationship between graph nodes storing 比尔·克林顿 and Bill Clinton for 比尔·克林顿 being a Chinese character translation of Bill Clinton. In some instances, for example, where a user has entered a node value and an edge relationship to another node value in enrichment memory graph 134, the confidence level in the edge relationship may be 100%

Moreover, based on bidirectional edge relationships in enrichment memory graph 136, further edge relationships may be inferred. For example, based on the two bidirectional examples above, the following bidirectional edge relationship may be inferred:

Билл Клинтон →← 比尔·克林顿

In this example, the confidence level for the inferred relationship may comprise a combination of the confidence levels indicated in the edge relationships between the БилКлинтон and Bill Clinton nodes and between the 比尔·克林顿 and Bill Clinton nodes. Based on the example confidence levels given above, the confidence level for the inferred relationship between Билл Клинтон and 比尔·克林顿 may be 77%.

Enrichment memory graph 136 may comprise islands of data, where each island comprises at least one node. All nodes of a data island, except for single-node islands, have at least one bi-directional relationship with another node on the island. If a node on a data island connects to a node on another data island by a relationship, one of the following two effects occurs:

(1) if that relationship is bi-directional, the two data islands are effectively merged into a single island, (2) if that relationship is unidirectional, the entire data islands may inherit that unidirectional relationship.

In step 206, enrichment search results may be provided with provenance and lineage to source raw data. For example, multi-model datastore manager 120 may be configured to receive a query for enriched data and may search the multi-model database for search results. The search results may identify raw data information and differentiate the raw data information from enriched data in the result. Also, an enrichment search result can pinpoint the record and field of a source raw data value stored in source raw datastore 130 in a full breadcrumb trail of provenance and lineage (e.g., a full sequential chain of enrichments reaching back to the source raw data value in source raw datastore 130).

Figure 3:
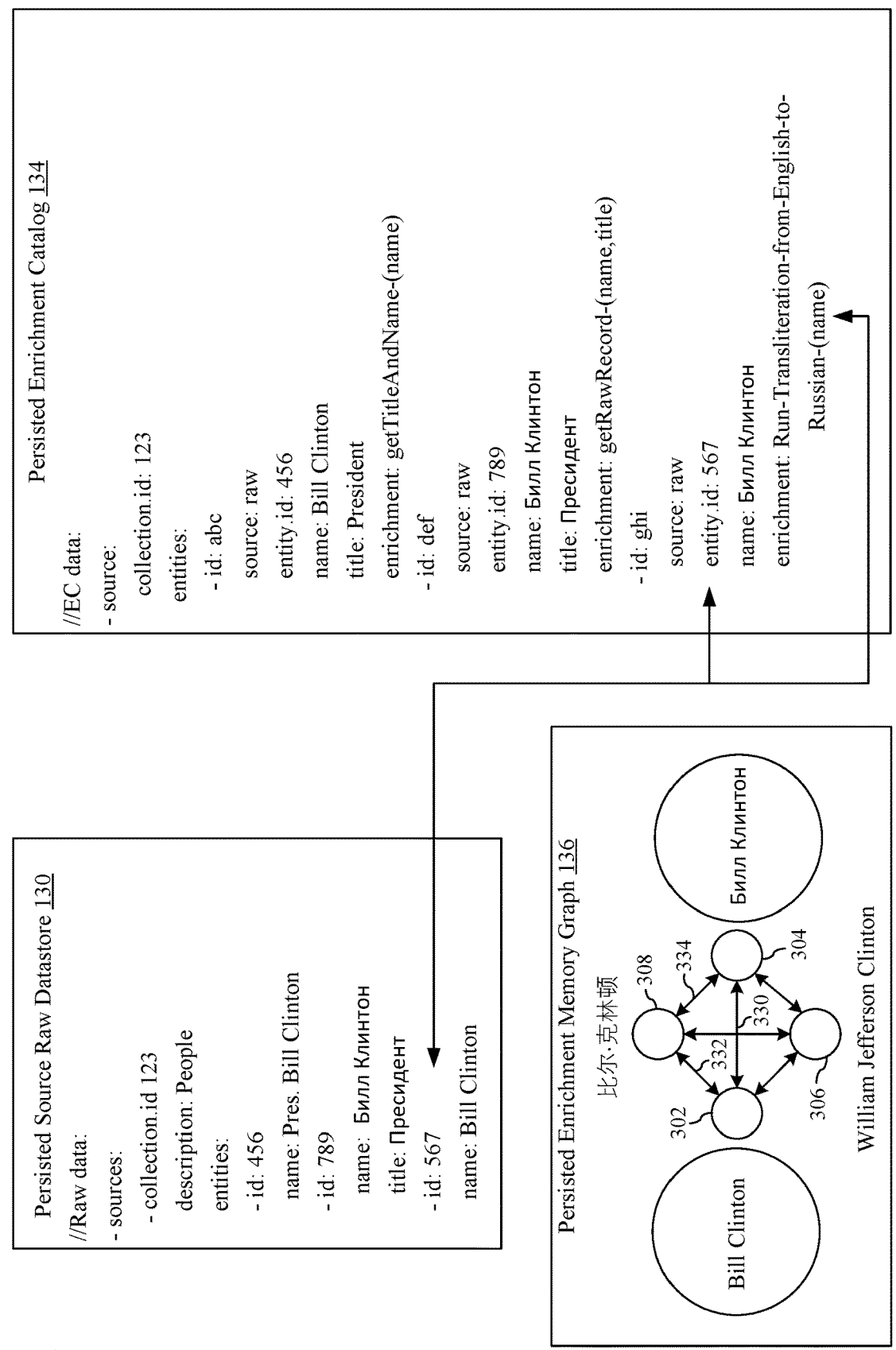
FIG. 3 is block diagram illustrating an example system including a source raw datastore and a multi-model datastore that includes a persisted enrichment catalog and a persisted enrichment memory graph, according to an example embodiment.

Methods for enriching data and executing search-response processes in the multi-modal datastore are described in more detail below. For instance, FIG. 3 is block diagram illustrating an example system 300 including a source raw datastore and a multi-model datastore comprising a persisted enrichment catalog and a persisted enrichment memory graph, according to an example embodiment. As shown in FIG. 3, system 300 includes source raw datastore 130, enrichment catalog 134, and enrichment memory graph 136. Enrichment memory graph 134 comprises node 302, node 304, node 306, node 308, edge relationship 330, edge relationship 332, and inferred edge relationship 334.

As described above, raw data may be collected (e.g., received) and stored in raw datastore 130, and this datastore and the stored raw data are sources relative to transformed (e.g., enriched) data that is stored in enrichment catalog 134 as enrichments. Referring to FIG. 3, the example entries shown in raw datastore 130 and in enrichment catalog 134 are represented in YAML (yet another mark-up language), which is a human readable serialization language used for representing data. The records shown in raw datastore 130 are organized by "collections" utilizing collection identifiers (e.g., collection.id 123). Although only one collection is shown in raw datastore 130, the raw datastore may store a plurality of collections and each collection may include a plurality of records (e.g., labeled entities). For example, collection 123 includes three records (i.e., three entities). One record includes the label "id" and stores a record identifier of "456." Record 456 includes one field that is labeled "name", and stores a raw data item comprising "Pres. Bill Clinton." Also shown in collection 123 are records identified as "789" and "567." Record 789 stores two raw data items, one identified as "name" storing the value Билл Клинтон ," and another identified as "title" storing the value "Президент ." Record 567 stores a field labeled "name" that stores a raw data item value "Bill Clinton."

As shown in example enrichment catalog 134, data is organized according to source raw data collections (e.g., collection 123 of raw data source 130) and enrichment catalog records (e.g., entities abc, def, and ghi). Although only one source raw data collection is represented in enrichment catalog 134, the enrichment catalog may be configured to store enriched data that is based on raw data from a plurality of raw datastores and/or a plurality of raw data collections. Referring to enrichment catalog 134, the record identified as "abc" includes enriched data item values including "Bill Clinton" and "President" that are identified as "name" and "title" respectively in enrichment catalog 134. In this example, record abc indicates that the "source" of the record is raw data (e.g., from raw datastore 130). "Collection.id: 123" is a pointer to a corresponding source collection, and "entity.id: 456" is a pointer to a corresponding source record in raw datastore 130. Also, an enrichment function identified in record abc as "enrichment: getTitle-AndName-(name)" indicates that the enriched data items "Bill Clinton" and "President" were generated by enriching a raw data item stored at the pointed to source raw collection identified as "123," source record identified as "456," and source field identified as "name" in raw datastore 130. In other words, the enriched data values "Bill Clinton" and "President" were determined by transforming the raw data item value "Pres. Bill Clinton" using an enrichment function or process that extracted a title and a name from the source raw data value. In this manner, the records stored in enrichment catalog 134 may not store the source raw data value itself, but may point to the source record and source field where the source raw data item is stored in the raw datastore. The enrichment catalog records may also may indicate how to generate the enriched data value utilizing the source raw data value stored according to the pointers (e.g., identifying which transformation function to execute on the source raw data item value stored in the source field and source record to generate the enriched data value).

Similarly, enriched data values "Билл Клинтон" and " Президент" that are identified as "name" and "title" respectively in enrichment catalog 134, and are associated in the enrichment catalog with the source collection identifier "123" and the record identified as "def" of enrichment catalog 134, were enriched utilizing an enrichment function identified as "getRawRecord-(name, title)." The input parameter values to the enrichment function are pointed to as being stored in fields identified as "name" and "title" of a raw source (e.g., of raw datastore 130), in a "source" collection identified as "123," a source record (or entity) identified as "789." In other words, by retrieving the raw data values at fields "name" and "title" in record "789" of collection "123" in source raw datastore 130 (e.g., source raw data values Билл Клинтон and Президент), and executing the enrichment function "getRawRecord-(name, title)," enriched data values "Билл Клинтон" and " Президент" of record "def" of enriched catalog 134 are generated.

Similarly, the enriched data value " Билл Клинтон " labeled "name" in record "ghi" of enrichment catalog 134, may be generated by executing the enrichment function "Run-Transliteration-from-English-to-Russian-(name)" where the input parameter value to the function is pointed to in enrichment catalog 134, as being retrievable from a raw source (e.g., raw datastore 130), in a source collection identified as "123," a source record (e.g., source entity) identified as "567," and source field identified as "name." Therefore the input parameter value to the enrichment function is "Bill Clinton" and the output is " Билл Клинтон."

Figure 4:
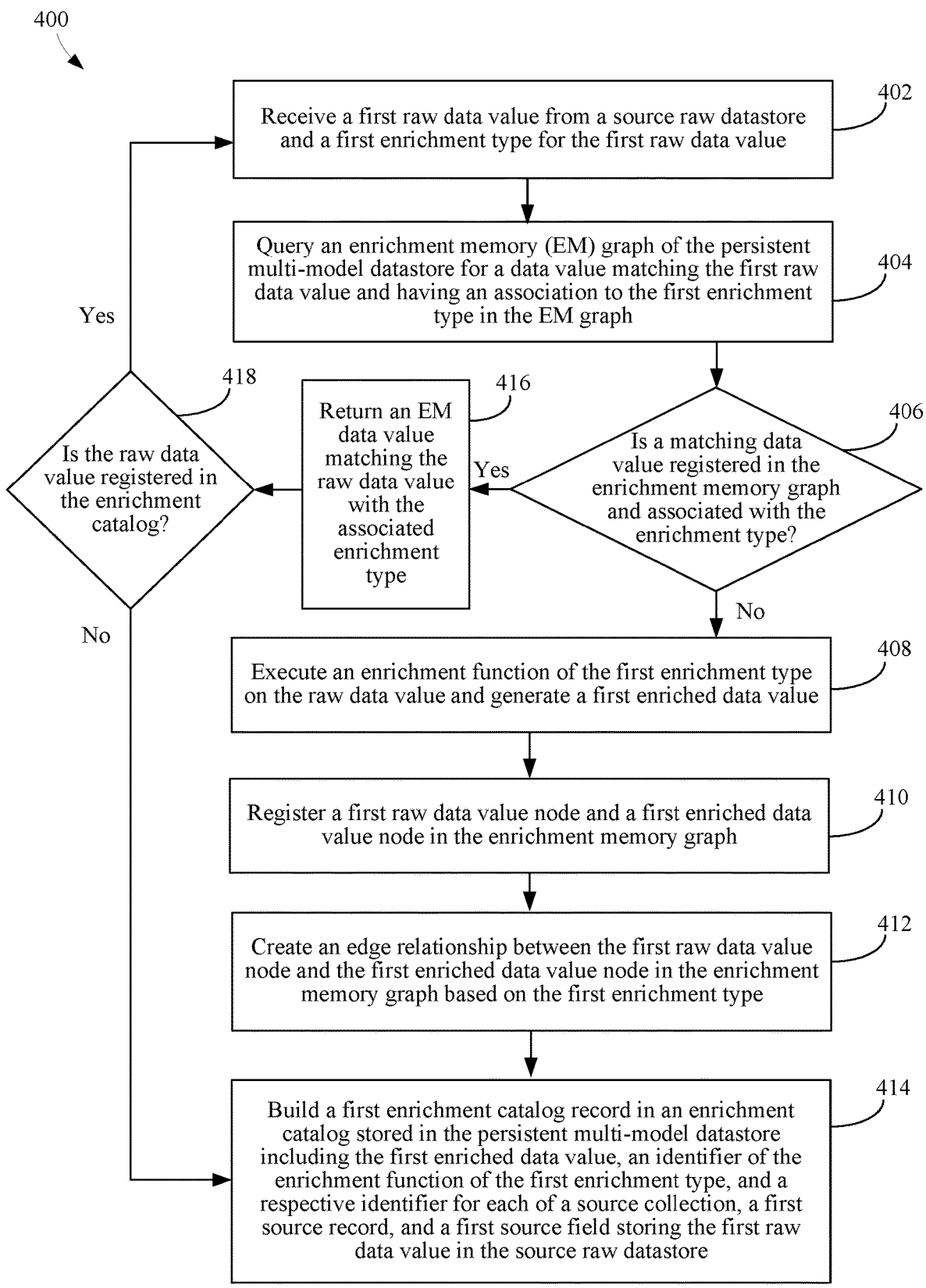
FIG. 4 is a flowchart of a method for building a persisted enrichment catalog and a persisted enrichment memory graph based on enriching raw data values, according to an example embodiment.

Enrichment catalog 134 may be populated during an enrichment process, and as a side effect of this process, enrichment memory graph 136 may also be populated. For instance, FIG. 4 is a flowchart 400 of a method for building a persisted enrichment catalog and a persisted enrichment memory graph based on enriching raw data values, according to an example embodiment. Flowchart 400 may be implemented in systems 100 and 300. For purposes of illustration, flowchart 400 is described with reference to FIGS. 1 and 3. Other structural and operational embodiments will be apparent to persons skilled in the relevant art(s) based on the following discussion regarding flowchart 400.

Flowchart 400 begins with step 402. In step 402, a first raw data value from a source raw datastore and a first enrichment type for the first raw data value are received. In one example, multi-model datastore manager 120 may be configured to receive a first raw data value comprising "Bill Clinton" from source raw datastore 130 and a first enrichment type. The first enrichment type may indicate a type of enrichment to perform on the first raw data value. In this example, the first enrichment type may comprise transliteration of a name from English to Russian. Moreover, multi-model datastore manager 120 may be configured to receive information about where or how the first raw data value is stored in the source raw datastore. For example, multi-model datastore manager 120 may be configured to receive a source raw data collection identifier (e.g., 123), a source record identifier (e.g., 567), and a source field identifier (e.g., name), pertaining to source raw datastore 130 and indicating precisely where to find (i.e., in which field) the source raw data value in source raw datastore 130.

In step 404, an enrichment memory graph of the persistent multi-model datastore may be queried for a data value matching the first raw data value and having an association to the first enrichment type in the enrichment memory graph. For example, multi-model datastore manager 120 may be configured to search enrichment memory graph 134 for a value matching the first raw data value (e.g., Bill Clinton) having an association matching the first enrichment type (e.g., transliteration from English to Russian). The association may comprise an edge relationship associated with a node storing the name "Bill Clinton."

In step 406, in instances where a data value matching the first raw data value is not registered in the enrichment memory graph and associated with the enrichment type, the method may proceed to step 408. For example, if a query result from enrichment memory graph 134 indicates that the name "Bill Clinton" is not stored in enrichment memory graph 134 with an association based on a "transliteration from English to Russian," the method may proceed to step 408.

In step 408, an enrichment function of the enrichment type may be executed on the raw data value and an enriched data value may be generated. For example, enrichment engine 122 may be configured to accept the raw data value comprising "Bill Clinton" and execute an enrichment function of the type "transliteration from English to Russian" on the raw data value. The output enriched data value may comprise " Билл Клинтон ."

In step 410, a first raw data value node and a first enriched data value node may be registered in the enrichment memory graph of the multi-model datastore in persistent storage. For example, enrichment memory graph constructor 124 may be configured to store the first raw data value "Bill Clinton" in node 302 and store the first enriched data value " Билл Клинтон " in node 304 of enrichment memory graph 136.

In step 412, an edge relationship may be created between the first raw data value node and the first enriched data value node in the persisted enrichment memory graph based on the first enrichment type. For example, enrichment memory graph constructor 124 may be configured to create edge relationship 330 between node 302 storing the first raw data value "Bill Clinton" and node 304 storing the first enriched data value " Билл Клинтон." The edge relationship may indicate the first enrichment type "transliteration from English to Russian" to generate the first enriched data value " Билл Клинтон ." In some embodiments, enrichment memory graph constructor 124 may be configured to store a value representing a probability value, or a confidence level, as to whether the first enriched data value " Билл Клинтон " is a correct transliteration of the English language name "Bill Clinton" to a Russian language version of the name Bill Clinton.

In step 414, a first enrichment catalog record is built in an enrichment catalog stored in the persistent multi-model datastore including the first enriched data value, an identifier of the enrichment function of the first enrichment type, and a respective identifier for each of a source collection, a first source record, and a first source field storing the first raw data value in the source raw datastore. For example, enrichment catalog constructor 126 may be configured to create a first record "id: ghi" in enrichment catalog 134 and store the first enriched data value " Билл Клинтон ," the identifier of the enrichment function of the first enrichment type "enrichment: Run-Transliteration-from-English-to-Russian," and a respective identifier for each of a source collection "source: collection.id: 123," a first source record "entity.id: 567," and a first source field "name" storing the first raw data value "Bill Clinton" in the source raw datastore 130 (e.g., source: raw), in the first record of enrichment catalog 134.

In some embodiments, a data value matching a received raw data value may have already been stored in the enrichment memory graph and may also be associated with the received enrichment type. In a second example, multi-model datastore manager 120 may be configured to receive a raw data value comprising "Bill Clinton" from source raw datastore 130, with an enrichment type of "transliteration-from-English-to-Russian" for the raw data value and may query enrichment memory graph 136. The source raw data collection identifier "123," a source record identifier "567," and source field identifier "name," in source raw datastore 130 may also be received. In this example, multi-model datastore manager 120 may be configured to determine that enrichment memory graph node 302 already stores a data value "Bill Clinton" matching the raw data value "Bill Clinton" and that it has a matching enrichment type association "transliteration-from-English-to-Russian" to node 304 comprising the value " Билл Клинтон." In this instance, a query response may be returned indicating the data value " Билл Клинтон" and the associated enrichment type "transliteration-from-English-to-Russian." Enrichment catalog constructor 126 may create a new record (e.g., a second enrichment catalog record (not shown)) in enrichment catalog 134 and store in that record the returned data value " Билл Клинтон" as an enriched data value, and the identifier of the enrichment function used to find the returned data value "enrichment: Lookup-Translation-from-English-to-Russian-in-Enrichment-Memory (source: raw, collection.id: 123, entity.id: 567, field.id (name))."

Figure 5:
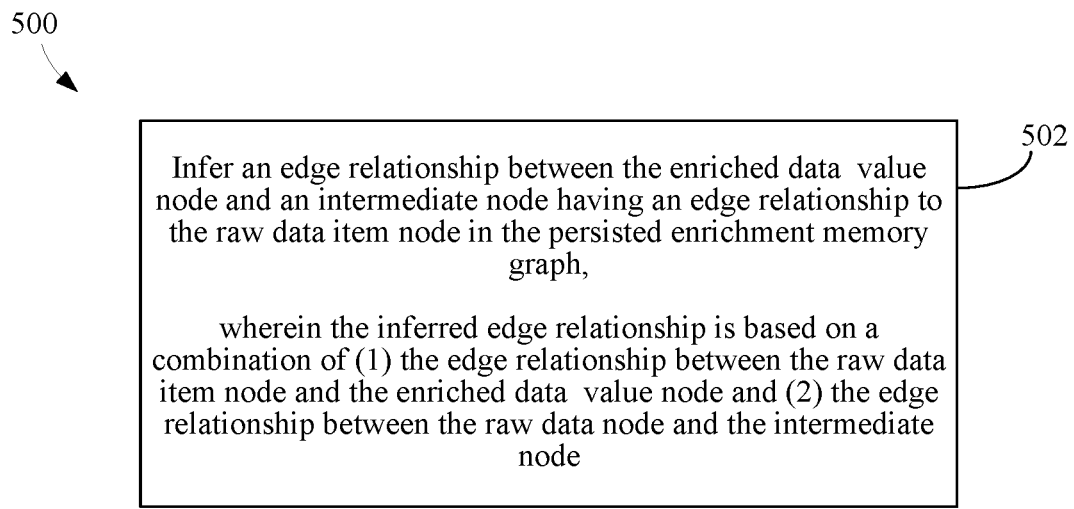
FIG. 5 is a flowchart of a method for inferring an edge relationship in the enrichment memory graph, according to an example embodiment.

As described above, some edge relationships in enrichment memory graph 134 may be inferred. For instance, FIG. 5 is a flowchart 500 of a method for inferring an edge relationship in the enrichment memory graph, according to an example embodiment. Flowchart 500 may be implemented in systems 100 and 300. For purposes of illustration, flowchart 500 is described with reference to FIGS. 1 and 3. Other structural and operational embodiments will be apparent to persons skilled in the relevant art(s) based on the following discussion regarding flowchart 500.

Flowchart 500 includes step 502. In step 502, an edge relationship may be inferred between the enriched data value node and an intermediate node having an edge relationship to the raw data item node in the persisted enrichment memory graph. The inferred edge relationship may be based on a combination of (1) the edge relationship between the raw data item node and the enriched data value node and (2) the edge relationship between the raw data node and the intermediate node. For example, referring to FIG. 3 in enrichment memory graph 136, the raw data item node 302 storing the value "Bill Clinton" may be associated with, or connected with, the enriched data value node 304 storing the value "Билл Клинтон" by an edge relationship 330 that indicates that node 304 comprises a value that is a Russian language translation from an English language version "Bill Clinton." Moreover, node 308 may comprise an intermediate node storing "比尔·克林顿)" that may be associated to the raw data item node 302 storing "Bill Clinton" by an edge relationship 332 that indicates that node 308 stores a value that is a Chinese character translation from an English language version "Bill Clinton." Enrichment memory constructor 124 may be configured to create an inferred edge relationship 334 between intermediate node 308 storing the value "比尔·克林顿)" and enriched data value node 304 storing the value "Билл Клинтон" by chaining intermediate node 308 via edge relationship 332 to node 302, and node 302 to node 304 via edge relationship 330. Information in the inferred edge relationship 334 may comprise a combination of information from edge relationship 332 and 330 and may indicate that the value stored in intermediate node 308 "比尔·克林顿" is a Chinese character translation from the value stored in enriched data value node 304 "Билл Клинтон." In other words, 比尔·克林顿 is a Chinese character translation of Билл Клинтон and vice versa. Also, a query to enrichment memory 134 for a Chinese translation of "Билл Клинтон" would return "比尔·克林顿." As described above, a probability may be included in inferred edge relationship 334 that may be determined based on a combination of a probability indicated in edge relationship 330 and a probability indicated in edge relationship 332.

Over time, new entries may be added to enrichment catalog 134 and enrichment memory 136 based on queries and requests for executing enrichment functions. Enrichment memory graph 136 may serve as a cache of previous enrichments that may be accessed based on a simple look-up process in response to queries and/or prior to executing enrichment functions. Also, as described above, users may add new nodes to enrichment memory graph 136, enter edge relationships between the newly added nodes and existing nodes, and/or enter edge relationships between nodes that were built by enrichment memory graph constructor 124.

Moreover, users may issue various queries to multi-model datastore 132 that includes enrichment catalog 134 and enrichment memory graph 136 and is stored in persistent storage 114. For example, multi-model datastore manager 138 may be configured to receive queries from a user (e.g., a data analyst) at user computing device 104 to find enriched data and corresponding source information, and may return query results (enriched data values) along with full breadcrumb provenance and lineage representing the source raw datastore, the source collection, the source record, the source field, and the enrichment function corresponding to an enriched data value in the query results. For example, a user may issue a query to multi-model datastore 132 for finding enriched citizenship data given a place of birth, for finding an enriched geographic location given an IP address, for finding an enriched country of origin or profession given an Arabic laqab, requesting a translation enrichment of a given term or name in a first human language to a respective equivalent term or name in a second human language, etc. Each respective query response received from multi-model datastore 132 may indicate at least one retrieved enriched data value from enrichment catalog 134 and/or from enrichment memory 136, and pointers (e.g., identifiers) indicating a source raw datastore, a source collection, a source record, and a source field storing a raw data value corresponding to the enriched data value, and further, an identifier of an enrichment function for generating the enriched data value given the raw data value stored in the source field.

Figure 6:
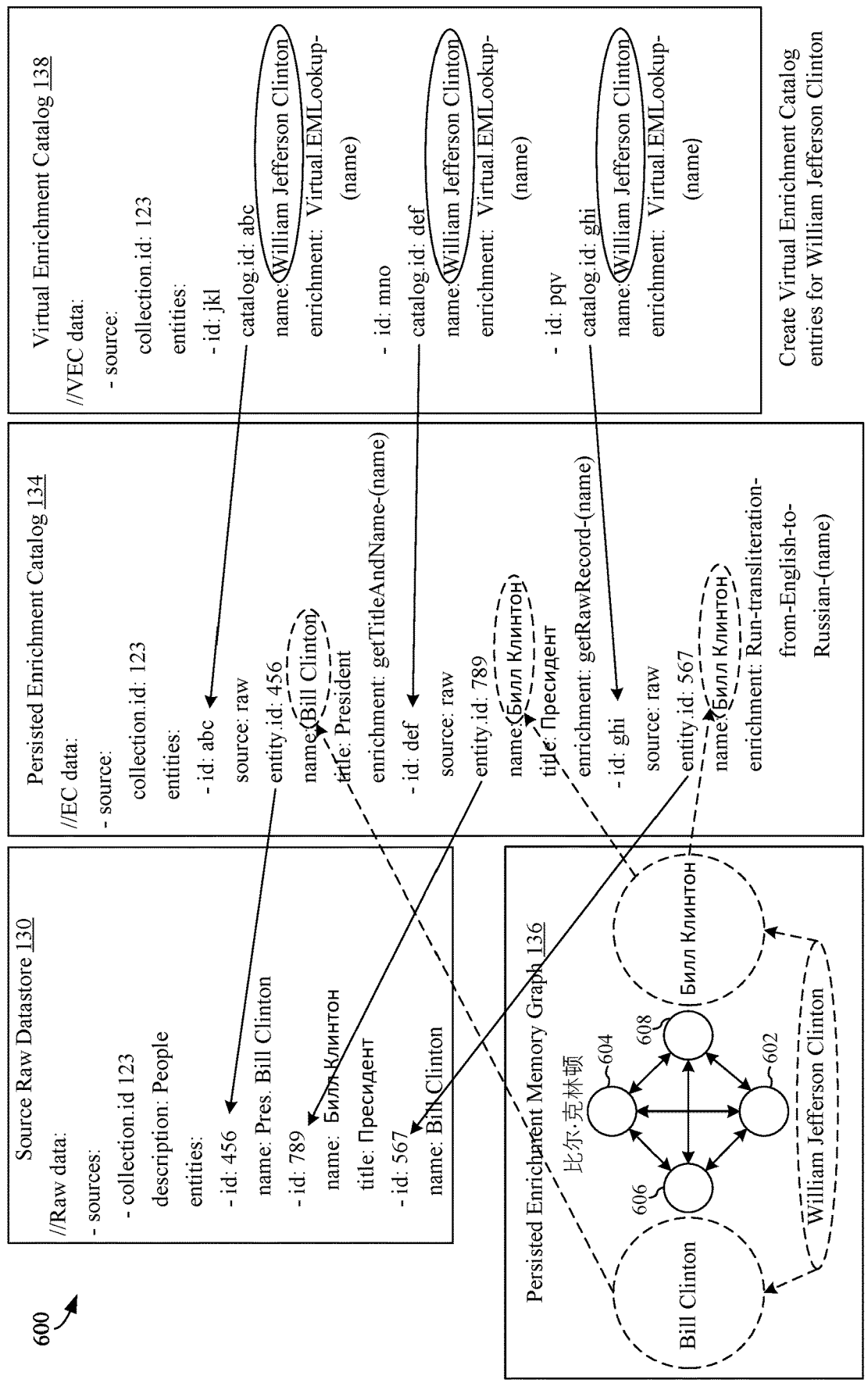
FIG. 6 is a diagram of a system for submitting queries into a persisted enrichment catalog and a persisted enrichment memory graph where the enrichment memory graph simulates virtual records in the enrichment catalog while maintaining full provenance and lineage, and generating query results with full breadcrumb provenance and lineage to source raw data value fields, according to an example embodiment.

For instance, FIG. 6 is a block diagram of a system 600 for submitting queries into a persisted enrichment catalog and a persisted enrichment memory graph where the enrichment memory graph simulates virtual records in the enrichment catalog while maintaining full provenance and lineage, and generating query results with full breadcrumb provenance and lineage to source raw data value fields, according to an example embodiment. As shown in FIG. 6, system 600 comprises source raw datastore 130, enrichment catalog 134, enrichment memory graph 136, a virtual enrichment catalog 138, a node 602, and a node 604, a node 606, and a node 608.

A query to multi-model datastore 132 from a user, or during an enrichment process, may first trigger a look-up to enrichment memory graph 136. In some instances a query to enrichment memory graph 136 may return one or more enriched data values that are not registered in enrichment catalog 134, but that have an edge relationship or an inferred edge relationship in enrichment memory graph 136 to one or more other enriched data values that are also registered in enrichment catalog 134. In this instance, virtual enrichment catalog constructor 128 may be configured to dynamically create a virtual enrichment catalog 138. The dynamically created virtual enrichment catalog 138 may include entries for each of the one or more enriched data values from enrichment memory graph 136 that are not registered in enrichment catalog 134. This virtual enrichment catalog 138 may be created in volatile memory (e.g., random access memory (RAM)) for the purpose of responding to the query. A virtual enrichment catalog 138 may serve as an addendum to enrichment catalog 134, and may be returned in a response to the query along with any of the enrichment catalog 134 records that are found based on the edge related or inferred edge related enriched data values found as a result of the query to the enrichment memory graph 136. The virtual enrichment catalog 138 entries may point to or identify where in enrichment catalog 134 the edge related or inferred edge related enriched data values are stored in enrichment catalog 134, and along with the enrichment catalog 134 entries that are returned with the virtual enrichment catalog 138 entries, may identify a full breadcrumb provenance and lineage to a corresponding source raw data collection, source record, source field, and enrichment function corresponding to a source raw value. In some embodiments, the virtual enrichment catalog 138 records are not stored in enrichment catalog 134 (which is stored in persistent memory). By using enrichment memory graph 136 to find enriched data values that are not stored in persistent storage in enrichment catalog 134, and dynamically creating the virtual enrichment catalog entries in RAM on an as needed basis, the system may conserve storage space while providing full breadcrumb provenance and lineage pinpointing where source raw data records and source raw data values are stored in source raw data storage and how to generate the enrichments.

Figure 7:
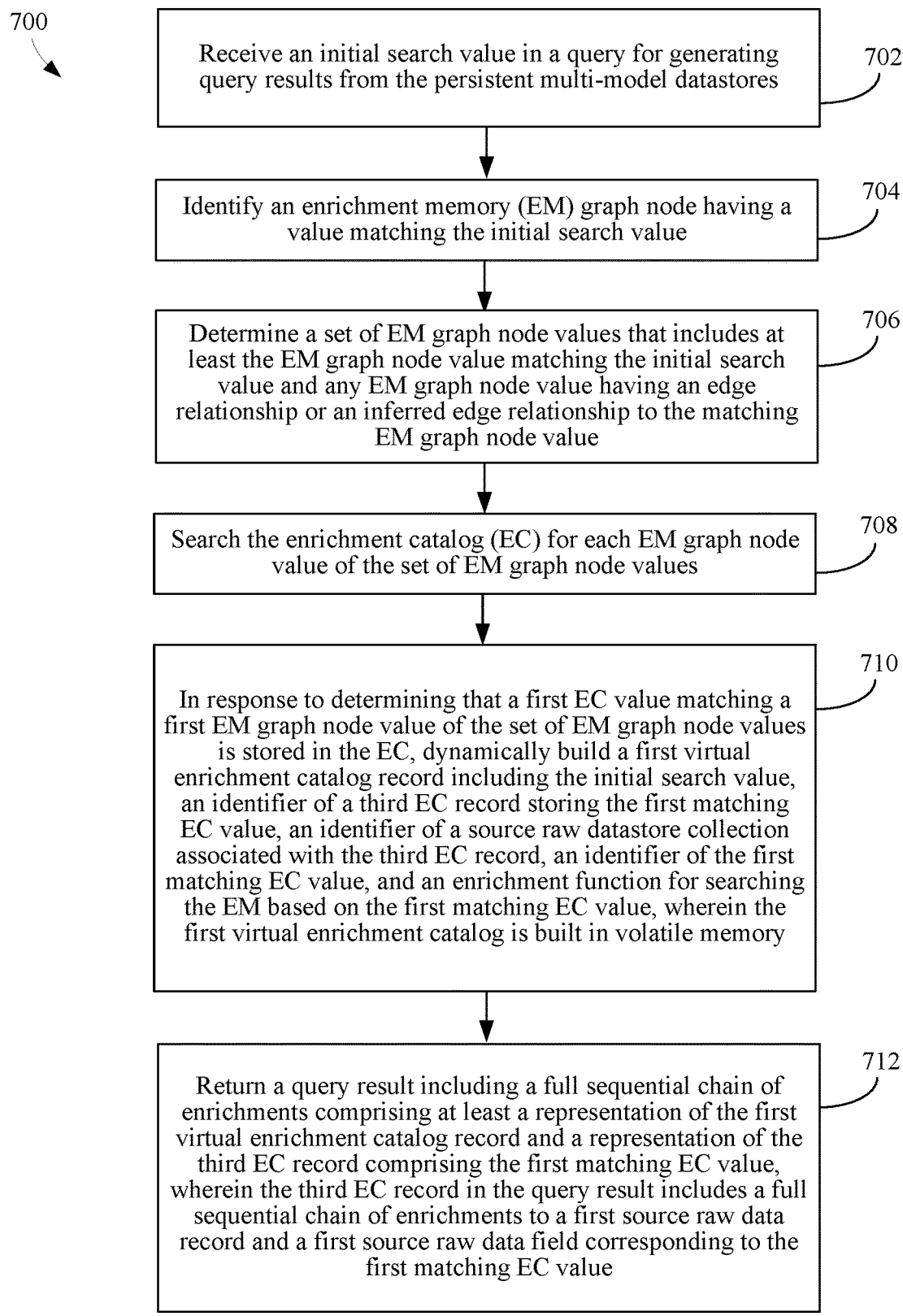
FIG. 7 is a flowchart of a method for creating a virtual enrichment catalog for responding to a query, according to an example embodiment.

In one example of creating a virtual enrichment catalog, FIG. 7 is a flowchart 700 of a method for creating a virtual enrichment catalog for responding to a query, according to an example embodiment. Flowchart 700 may be implemented in systems 100, 300, and 600. For purposes of illustration, flowchart 700 is described with reference to FIGS. 1, 3, and 6. Other structural and operational embodiments will be apparent to persons skilled in the relevant art(s) based on the following discussion regarding flowchart 700.

Flowchart 700 begins with step 702. In step 702, an initial search value is received in a query for generating query results from the persistent multi-model datastore. For example, multi-model datastore manager 128 may be configured to receive a query with an initial search value. The query may have been issued by a user at user computing device 104 and transmitted to processor 110. In one example, the initial search value may be "William Jefferson Clinton."

In step 704, an enrichment memory graph node having a value matching the initial search value may be identified. For example, multi-model datastore manager 138 may be configured to query enrichment memory graph 136 and may find or identify a value "William Jefferson Clinton" in node 602 of enrichment memory graph 136 that matches the initial search value 'William Jefferson Clinton."

In step 706, a set of enrichment memory graph node values are determined that includes at least the enrichment memory graph node value matching the initial search value and any enrichment memory graph node values having an edge relationship or an inferred edge relationship to the matching enrichment memory graph node value. For example, multi-model datastore manager 128 may be configured to determine a set of enrichment memory graph 136 node values that includes enrichment memory graph node 602 value "William Jefferson Clinton," and values stored at enrichment memory graph nodes 604, 606, and 608 comprising "比尔·克林顿" "Bill Clinton," and "Билл Клинтон" respectively. There may be an edge relationship or an inferred edge relationship between any two nodes of the set.

In step 708, the enrichment catalog may be searched for each enrichment memory graph node value of the set of enrichment memory graph node values. For example, multi-model datastore manager 120 may be configured to search in enrichment catalog 134 for each of the values stored at nodes 602, 604, 606, and 608 comprising "William Jefferson Clinton," "比尔·克林顿," "Bill Clinton," and "Билл Клинтон" respectively.

In step 710, in response to determining that a first enrichment catalog value matching a first enrichment memory graph node value of the set of enrichment memory graph node values is stored in the enrichment catalog, dynamically build a first virtual enrichment catalog record including the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value, wherein the first virtual enrichment catalog is built in volatile memory.

For example, referring to FIGS. 1 and 6, in response to multi-model datastore manager 120 determining that a first enrichment catalog value comprising "Bill Clinton" that matches the first enrichment memory graph node 606 value comprising the value "Bill Clinton," of the set of enrichment memory graph node 602, 604, 606, and 608 values comprising "William Jefferson Clinton," "比尔·克林顿," "Bill Clinton," and "Билл Клинтон" respectively, is stored in enrichment catalog 134, virtual enrichment catalog constructor 128 is configured to dynamically build a first virtual enrichment catalog 138 record "jkl" including the initial search value "William Jefferson Clinton," an identifier of a third enrichment catalog record "abc" storing the first matching enrichment catalog value "Bill Clinton," an identifier "123" of a source raw datastore 130 collection "123" associated with the third enrichment catalog record "jkl," an identifier of the first matching enrichment catalog value "name," and the enrichment function "Virtual. EMLookup-(name)" for searching enrichment memory graph 136 based on the first matching enrichment catalog value "Bill Clinton." The first virtual enrichment catalog 138 may be built in volatile memory 112.

In step 712, a query result may be returned including a full sequential enrichment chain that comprises at least a representation of the first virtual enrichment catalog record and a representation of the third enrichment catalog record comprising the first enrichment catalog value matching the first enrichment memory graph node value. The third enrichment catalog record included in the query result may include a full sequential chain of enrichments to a first source raw data record and a first source raw data field corresponding to the first matching enrichment catalog value. In other words, each query result may be assembled utilizing enrichment-chaining where the provenance and lineage breadcrumbs provide a sequential chain of enrichment functions and pointers to corresponding values processed in each enrichment function of the chain to generate each enrichment value. A full sequential chain of enrichments may span the initial search value found in the enrichment memory graph, values related to the initial search value in the enrichment memory graph (e.g., including edge relationship information), related (e.g., matching) values stored in the enrichment catalog (e.g., including record and field pointers to the values), and raw data values stored in a source raw data store (e.g., including record and field pointers to the raw data values). For example, a query result may be returned for the query including the initial search value made to multi-model datastore 132. The query result may comprise at least a representation of the first virtual enrichment catalog 138 record "jkl" described above (e.g., including among other things the initial search value), and a representation of the third enrichment catalog record "abc" comprising the first matching enrichment catalog 134 value "Bill Clinton" that matches the first enrichment memory graph 136 node value "Bill Clinton." The third enrichment catalog 134 record included in the query result may include a full sequential chain of enrichments to a first source raw data record "456" and a first source raw data field "name" in the source raw datastore 123 corresponding to the first matching enrichment catalog value "Bill Clinton."

The full sequential chain of enrichments to the first source raw data record "456" and the first source raw data field "name" corresponding to the first matching enrichment catalog value "Bill Clinton" (e.g., stored in enrichment catalog 134 record "abc"), which is included in the query result, may include an identifier of the source raw datastore 130 collection "123," an identifier of a corresponding source raw data record "456," an identifier "name" of the corresponding source raw data field, and an identifier of an enrichment function "getTitleAndName-(name)" for generating the first matching enrichment catalog 134 value "Bill Clinton" corresponding to the source raw data field "name."

In one example, the breadcrumb history including a full sequential chain of enrichments back to a source raw data value "Pres. Bill Clinton," shown in raw datastore 130 under record "456," from the value "William Jefferson Clinton" dynamically created in virtual enrichment catalog 138, under record "jkl" may be represented as follows:

Virtual.EMLookup(collection: 123, catalog: abc, label: name)
GetTitleAndName(collection:123, rawdata:456, label: name)
RawRecordSpec(collection:123, rawdata:456)

In some embodiments, multi-model datastore manager 120 may be further configured to determine that a second matching enrichment catalog 134 value "Билл Клинтон" matches a second enrichment memory graph 136 node 608 value "Билл Клинтон" of the set of enrichment memory graph 136 node values "William Jefferson Clinton," "比尔·克林顿," "Bill Clinton," and "Билл Клинтон" is stored in enrichment catalog 134. In response to this determination, virtual enrichment catalog constructor may be configured to dynamically build a second virtual enrichment catalog 138 record "mno" that includes the initial search value "William Jefferson, Clinton," an identifier of a fourth enrichment catalog record "def" storing the second matching enrichment catalog value "Билл Клинтон ", an identifier of a source raw datastore collection 123 associated with the fourth enrichment catalog record "def," and an enrichment function for searching the enrichment memory graph 136 based on the second matching enrichment catalog value "Билл Клинтон ." For example, to find the initial search value "William Jefferson Clinton" in enrichment memory graph 136 via node 608 storing "Билл Клинтон " and an intervening edge relationship.

The multi-model datastore manager 128 may also be configured to return a full sequential chain of enrichments including the second virtual enrichment catalog 138 record "mno" in the query result with a representation of the fourth enrichment catalog record "def" comprising the second matching enrichment catalog value "Билл Клинтон ." The fourth enrichment catalog record "def" in the query result may also include a full breadcrumb history to a second source raw data record "789" and a second source raw data field "name" corresponding to the second matching enrichment catalog value "Билл Клинтон ." The portion of the full sequential chain of enrichments corresponding to the second matching enrichment catalog value "Билл Клинтон " in the query result may include an identifier of the source raw datastore 130 collection "123," an identifier of the corresponding source raw data record "789," identifier "name" of the corresponding source raw data field, and an identifier of an enrichment function "getRawRecord-(name)" for generating the second matching enrichment catalog 134 value "Билл Клинтон " based on the value Билл Клинтон " of the corresponding source raw data field "name."

When creating a virtual enrichment catalog 138, other enrichment memory graph 136 node values may be utilized as the first enrichment memory graph node value. For example, the first enrichment memory graph node value may comprise the matching enrichment memory graph node value "William Jefferson Clinton," an enrichment memory graph node value having an edge relationship to the matching enrichment memory graph node value "William Jefferson Clinton" (e.g., "Bill Clinton" or "Билл Клинтон ") or an enrichment memory graph 136 node value having an inferred edge relationship to the matching enrichment memory graph node value "William Jefferson Clinton" (e.g., 比尔·克林顿 ") in the enrichment memory graph 136.

As described above, node values in enrichment memory graph 136 may comprise numerical or character based values. Referring to the example above, an edge relationship or inferred edge relationship between the enrichment memory graph node value matching the initial search value and an enrichment memory graph 136 node value of the set of enrichment memory graph node values may be based on an edge relationship other than a term or name language translation. For example, for node values comprising numerical or character based values, an edge relationship may be based on any suitable type of transformation including a transformation from numerical data to numerical data or numerical data to character based data and vice versa (e.g. deriving citizenship data from place of birth data, mapping IP address data to geolocation data, deriving country of origin data or profession data from Arabic laqab data). In this manner, enrichment memory graph 136 provides improved transformation capability relative to language translation memory systems, terminology database systems, or other systems that may be used in computer-assisted-translation (CAT) tools, which are concerned with linguistic elements.

III. Example Computer System Implementation

Embodiments described herein may be implemented in hardware, or hardware combined with software and/or firmware. For example, embodiments described herein including but not limited to, system 100, system 300, and system 600 may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to system 100, system 300, and system 600 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 8:
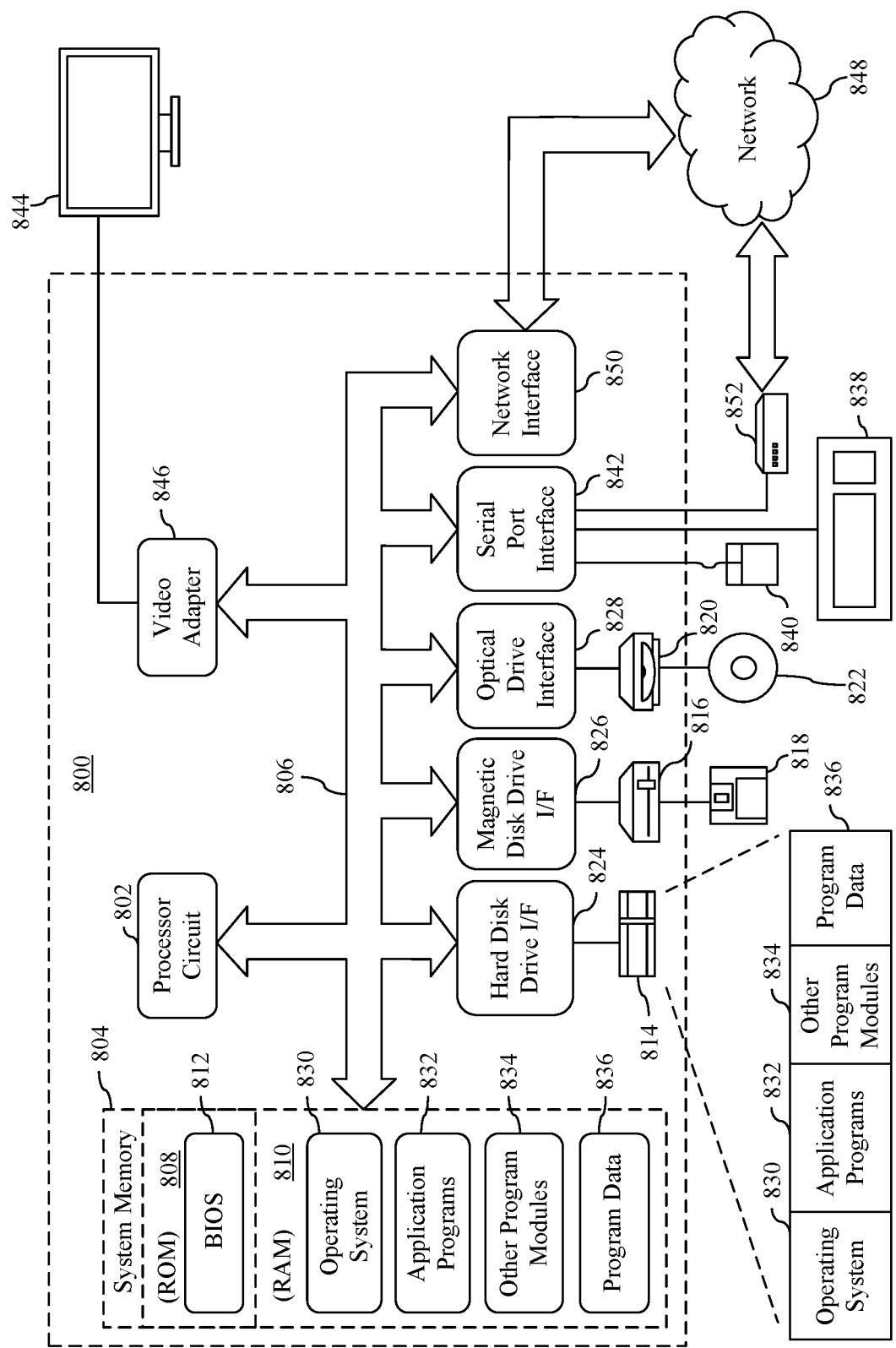
FIG. 8 is an example processor-based computer system that may be used to implement various example embodiments.

FIG. 8 is a block diagram of an example processor-based computer system 1000 that may be used to implement various embodiments. The computing devices of system 100, system 300, and system 600, may each include any suitable type of computing device, mobile or stationary, such as a desktop computer, a server, a video game console, etc. For example, any of the computing devices of system 100, system 300, and system 600 may be any suitable type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™ Oculus Rift® by Oculus VR, LLC, a head-wearable audio device, etc.), a stationary computing device such as a desktop computer or PC (personal computer), a gaming console/system (e.g., Microsoft Xbox®, Sony PlayStation®, Nintendo Wii® or Switch®, etc.), etc.

The computing devices of system 100, system 300, and system 600 may each be implemented in one or more computing devices containing features similar to those of computing device 800 in stationary or mobile computer embodiments and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing source raw datastore 130, multi-model datastore 132, enrichment catalog 134, enrichment memory graph 136, virtual enrichment catalog 138, multi-model datastore manager 120, enrichment engine 122, enrichment memory graph constructor 124, enrichment catalog constructor 126, virtual enrichment catalog constructor 128, flowchart 200, flowchart 400, flowchart 500, flowchart 700, and/or further embodiments described herein. Program data 836 may include information stored in source raw datastore 130 including collection, entity (or record), and field data, information stored in enrichment catalog 134 including source, collection, entity (or record), field, and enrichment data, information stored in enrichment memory graph 136 including node 302, node 304, node 306, and node 308 data, edge relationship 330, edge relationship 332, and edge relationship 334 data, node 602, node 604, node 606, and node 608 data, information stored in virtual enrichment catalog (stored in RAM) including source, collection, entity (or record), catalog, field, and enrichment data, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system is provided for maintaining provenance and lineage across a persistent multi-model datastore. The system comprises a processor and a memory device. The memory device stores program code to be executed by the processor. The program code comprises a multi-model datastore manager configured to receive a first raw data value from a source raw datastore and a first enrichment type for the first raw data value. An enrichment memory graph of the persistent multi-model datastore is queried for a data value matching the first raw data value and having an association to the first enrichment type in the enrichment memory graph. An enrichment engine is configured to, in response to determining that a data value matching the first raw data value and having an association to the first enrichment type is not registered in the enrichment memory graph, generate a first enriched data value by executing an enrichment function of the first enrichment type on the first raw data value. An enrichment memory graph constructor is configured to register a node for the first raw data value and a node for the first enriched data value in the enrichment memory graph and create an edge relationship between the first raw data value node and the first enriched data value node in the enrichment memory graph based on the first enrichment type. An enrichment catalog constructor is configured to build a first enrichment catalog record in an enrichment catalog that is stored in the persistent multi-model datastore. The first enrichment catalog record includes the first enriched data value, an identifier of the enrichment function of the first enrichment type, and a respective identifier for each of a source collection, a first source record, and a first source field storing the first raw data value in the source raw datastore.

In an embodiment of the foregoing system, the multi-model datastore manager is further configured to receive a second raw data value from the source raw datastore and a second enrichment type for the second raw data value. In response to determining that a data value matching the second raw data value and having an association to the second enrichment type is registered in the enrichment memory graph, the matching data value is returned with the associated second enrichment type. The enrichment catalog constructor is further configured to build a second enrichment catalog record including the data value matching the second raw data value and an identifier of an enrichment function indicating an enrichment memory graph lookup process for the second raw data value that has an association to the second enrichment type.

In an embodiment of the foregoing system the enrichment memory graph constructor is further configured to infer an edge relationship between the first enriched data value node and an intermediate node having an edge relationship to the first raw data value node in the enrichment memory graph. The inferred edge relationship is based on a combination of (1) the edge relationship between the first raw data value node and the first enriched data value node, and (2) an edge relationship between the first raw data value node and the intermediate node.

In an embodiment of the foregoing system the multi-model datastore manager is further configured to receive an initial search value in a query for generating query results from the persistent multi-model datastore. An enrichment memory graph node having a value matching the initial search value is identified. A set of enrichment memory graph node values is determined. The set includes at least the enrichment memory graph node value matching the initial search value and may include any enrichment memory graph node value having an edge relationship or an inferred edge relationship to the matching enrichment memory graph node value. The enrichment catalog is searched for each enrichment memory graph node value of the set of enrichment memory graph node values. The system further comprises a virtual enrichment catalog constructor configured to, in response to determining that a first enrichment catalog value that matches a first enrichment memory graph node value of the set of enrichment memory graph node values is stored in the enrichment catalog, a first virtual enrichment catalog record is dynamically built. The first virtual enrichment catalog record includes the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value. The first virtual enrichment catalog is built in volatile memory. The multi-model datastore manager is further configured to: return a query result including a full sequential chain of enrichments comprising at least a representation of the first virtual enrichment catalog record and a representation of the third enrichment catalog record comprising the first matching enrichment catalog value. The third enrichment catalog record in the query result includes a full breadcrumb history to a first source raw data record and a first source raw data field corresponding to the first matching enrichment catalog value.

In an embodiment of the foregoing system, the full breadcrumb history to a first source raw data record and first source raw data field corresponding to the first matching enrichment catalog value includes: an identifier of the source raw datastore collection, an identifier of a corresponding source raw data record, an identifier a corresponding source raw data field, and an identifier of an enrichment function for generating the first matching enrichment catalog value based on the value of the corresponding source raw data field.

In an embodiment of the foregoing system, the virtual enrichment catalog constructor is further configured to, in response to a determination that a second enrichment catalog value matching a second enrichment memory graph node value of the set of enrichment memory graph node values is stored in the enrichment catalog, dynamically build a second virtual enrichment catalog record including the initial search value, an identifier of a fourth enrichment catalog record storing the second matching enrichment catalog value, an identifier of a source raw datastore collection associated with the fourth enrichment catalog record, and an enrichment function for searching the enrichment memory graph based on the second matching enrichment catalog value. The multi-model datastore manager is further configured to return the second virtual enrichment catalog record in the query result in a full sequential chain of enrichments with a representation of the fourth enrichment catalog record comprising the second matching enrichment catalog value, the fourth enrichment catalog record in the query result includes a full breadcrumb history to a second source raw data record and a second source raw data field corresponding to the second matching enrichment catalog value.

In an embodiment of the foregoing system, the first enrichment memory graph node value comprises: the matching enrichment memory graph node value, an enrichment memory graph node value having an edge relationship to the matching enrichment memory graph node value, or an enrichment memory graph node value having an inferred edge relationship to the matching enrichment memory graph node value in the enrichment memory graph.

In an embodiment of the foregoing system, wherein: one or both of the first raw data value and the first enriched data value comprise a numerical value; and an edge relationship or inferred edge relationship between the enrichment memory graph node value matching the initial search value and an enrichment memory graph node value of the set of enrichment memory graph node values is based on a relationship other than a term translation.

In an embodiment of the foregoing system, node entries and edge relationship entries in the enrichment memory graph are configurable based on user input.

In an embodiment, a method is provided for maintaining provenance and lineage across a persistent multi-model datastore with uniform representation of enrichments. The method comprises receiving a first raw data value from a source raw datastore and a first enrichment type for the first raw data value. An enrichment memory graph of the persistent multi-model datastore is queried for a data value that matches the first raw data value and that has an association to the first enrichment type in the enrichment memory graph.

In response to determining that a data value matching the first raw data value and having an association to the first enrichment type is not registered in the enrichment memory graph, a first enriched data value is generated by executing an enrichment function of the first enrichment type on the first raw data value. A node for the first raw data value and a node for the first enriched data value are registered in the enrichment memory graph. An edge relationship is created between the first raw data value node and the first enriched data value node in the enrichment memory graph based on the first enrichment type. A first enrichment catalog record is built in an enrichment catalog that is stored in the persistent multi-model datastore. The first enrichment catalog record includes the first enriched data value, an identifier of the enrichment function of the first enrichment type, and a respective identifier for each of a source collection, a first source record, and a first source field storing the first raw data value in the source raw datastore.

In an embodiment of the foregoing method, a second raw data value from the source raw datastore and a second enrichment type for the second raw data value are received. In response to determining that a data value matching the second raw data value and having an association to the second enrichment type is registered in the enrichment memory graph, the matching data value is returned with the associated second enrichment type. A second enrichment catalog record including the data value that matches the second raw data value and an identifier of an enrichment function indicating an enrichment memory lookup process for the second raw data value having an association to the second enrichment type.

In an embodiment of the foregoing method, an edge relationship is inferred between the first enriched data value node and an intermediate node having an edge relationship to the first raw data value node in the persisted enrichment memory graph. The inferred edge relationship is based on a combination of (1) the edge relationship between the first raw data value node and the first enriched data value node and, (2) an edge relationship between the first raw data value node and the intermediate node In an embodiment of the foregoing method, an initial search value is received in a query for generating query results from the persistent multi-model datastore. An enrichment memory graph node that has a value matching the initial search value is received. A set is determined that comprises enrichment memory graph node values that includes at least the enrichment memory graph node value matching the initial search value and any enrichment memory graph node value having an edge relationship or an inferred edge relationship to the matching enrichment memory graph node value. The enrichment catalog is searched for each enrichment memory graph node value of the set of enrichment memory graph node values. In response to finding a first enrichment catalog value matching a first enrichment memory graph node value of the set of enrichment memory graph node values, a first virtual enrichment catalog record is dynamically built, which includes the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value. A query result is returned including a full sequential chain of enrichments that comprises at least a representation of the first virtual enrichment catalog record and a representation of the third enrichment catalog record comprising the first matching enrichment catalog value. The third enrichment catalog record in the query result includes a full breadcrumb history to a first source raw data record and a first source raw data field corresponding to the first matching enrichment catalog value.

In an embodiment of the foregoing method, the full breadcrumb history to a first source raw data record and a first source raw data field corresponding to the first matching enrichment catalog value includes: an identifier of the source raw datastore collection, an identifier of a corresponding source raw data record, an identifier a corresponding source raw data field, and an identifier of an enrichment function for generating the first matching enrichment catalog value based on the value of the corresponding source raw data field.

In an embodiment of the foregoing method, in response to finding a second enrichment catalog value matching a second enrichment memory graph node value of the set of enrichment memory graph node values, a second virtual enrichment catalog record is dynamically built that includes the initial search value, an identifier of a fourth enrichment catalog record storing the second matching enrichment catalog value, an identifier of a source raw datastore collection associated with the fourth enrichment catalog record, and an enrichment function for searching the enrichment memory graph based on the second matching enrichment catalog value. The second virtual enrichment catalog record is returned in the query result in a full sequential chain of enrichments with a representation of the fourth enrichment catalog record comprising the second matching enrichment catalog value. The fourth enrichment catalog record in the query result includes a full breadcrumb history to a second source raw data record and a second source raw data field corresponding to the second matching enrichment catalog value.

In an embodiment of the foregoing method, the first enrichment memory graph node value comprises: the matching enrichment memory graph node value, an enrichment memory graph node value having an edge relationship to the matching enrichment memory graph node value, or an enrichment memory graph node value having an inferred edge relationship to the matching enrichment memory graph node value in the enrichment memory graph.

In an embodiment of the foregoing method, wherein: one or both of the first raw data value and the first enriched data value comprise a numerical value; and an edge relationship or inferred edge relationship between the enrichment memory graph node value matching the initial search value and an enrichment memory graph node value of the set of enrichment memory graph node values is based on a relationship other than a term translation.

In an embodiment of the foregoing method, wherein entries in the enrichment memory graph are configurable based on user input.

In an embodiment, a computer-readable storage medium having program code recorded thereon that when executed by at least one processor causes the at least one processor to perform a method. The method comprises receiving a first raw data value from a source raw datastore and a first enrichment type for the first raw data value. An enrichment memory graph of the persistent multi-model datastore is queried for a data value matching the first raw data value and having an association to the first enrichment type in the enrichment memory graph. In response to determining that a data value matching the first raw data value and having an association to the first enrichment type is not registered in the enrichment memory graph, a first enriched data value is generated by executing an enrichment function of the first enrichment type on the first raw data value. A node for the first raw data value and a node for the first enriched data value are registered in the enrichment memory graph. An edge relationship is created between the first raw data value node and the first enriched data value node in the enrichment memory graph based on the first enrichment type. A first enrichment catalog record in an enrichment catalog that is stored in the persistent multi-model datastore includes the first enriched data value, an identifier of the enrichment function of the first enrichment type, and a respective identifier for each of a source collection, a first source record, and a first source field storing the first raw data value in the source raw datastore.

In an embodiment of the foregoing computer-readable storage medium, the method further comprises receiving an initial search value in a query for generating query results from the persistent multi-model datastore and identifying an enrichment memory graph node having a value matching the initial search value. A set of enrichment memory graph node values is determined, which includes at least the enrichment memory graph node value matching the initial search value and any enrichment memory graph node value having an edge relationship or an inferred edge relationship to the matching enrichment memory graph node value. The enrichment catalog is searched for each enrichment memory graph node value of the set of enrichment memory graph node values. In response to finding a first enrichment catalog value matching a first enrichment memory graph node value of the set of enrichment memory graph node values, dynamically building a first virtual enrichment catalog record including the initial search value, an identifier of a second enrichment catalog record storing the first matching enrichment catalog value, an identifier of a source raw datastore collection associated with the second enrichment catalog record, an identifier of the first matching enrichment catalog value, and an enrichment function for searching the enrichment catalog based on the first matching enrichment catalog value. A query result is returned including a full sequential chain of enrichments that comprises at least a representation of the first virtual enrichment catalog record and a representation of the second enrichment catalog record comprising the first matching enrichment catalog value. The second enrichment catalog record in the query result includes a full breadcrumb history to a first source raw data record and a first source raw data field corresponding to the first matching enrichment catalog value.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for maintaining provenance and lineage across a persistent multi-model datastore, the system comprising:

a processor; and
a memory device, the memory device storing program code to be executed by the processor, the program code comprising:
a multi-model datastore manager configured to:
   receive a first raw data value from a source raw datastore and a first enrichment type for the first raw data value;
   query an enrichment memory graph of the persistent multi-model datastore for a data value matching the first raw data value and having an association to the first enrichment type in the enrichment memory graph;
an enrichment engine configured to:
   in response to determining that a data value matching the first raw data value and having an association to the first enrichment type is not registered in the enrichment memory graph, generate a first enriched data value by executing an enrichment function of the first enrichment type on the first raw data value;
an enrichment memory graph constructor configured to:
   register a node for the first raw data value and a node for the first enriched data value in the enrichment memory graph; and
   create an edge relationship between the first raw data value node and the first enriched data value node in the enrichment memory graph based on the first enrichment type; and
an enrichment catalog constructor configured to:
   build a first enrichment catalog record in an enrichment catalog stored in the persistent multi-model datastore including the first enriched data value, an identifier of the enrichment function of the first enrichment type, and a respective identifier for each of a source collection, a first source record, and a first source field storing the first raw data value in the source raw datastore.

2. The system of claim 1, wherein the multi-model datastore manager is further configured to:
   receive a second raw data value from the source raw datastore and a second enrichment type for the second raw data value; and
   in response to determining that a data value matching the second raw data value and having an association to the second enrichment type is registered in the enrichment memory graph, return the matching data value with the associated second enrichment type; and wherein the enrichment catalog constructor is further configured to:
   build a second enrichment catalog record including the data value matching the second raw data value and an identifier of an enrichment function indicating an enrichment memory graph lookup process for the second raw data value having an association to the second enrichment type.

3. The system of claim 1, wherein the enrichment memory graph constructor is further configured to:
   infer an edge relationship between the first enriched data value node and an intermediate node having an edge relationship to the first raw data value node in the enrichment memory graph, wherein the inferred edge relationship is based on a combination of (1) the edge relationship between the first raw data value node and the first enriched data value node and (2) an edge relationship between the first raw data value node and the intermediate node.

4. The system of claim 1, wherein the multi-model datastore manager is further configured to:
   receive an initial search value in a query for generating query results from the persistent multi-model datastore;
   identify an enrichment memory graph node having a value matching the initial search value;
   determine a set of enrichment memory graph node values that includes at least the enrichment memory graph node value matching the initial search value and any enrichment memory graph node value having an edge relationship or an inferred edge relationship to the matching enrichment memory graph node value; and
   search the enrichment catalog for each enrichment memory graph node value of the set of enrichment memory graph node values;
the system further comprising a virtual enrichment catalog constructor configured to:
   in response to a determination that a first enrichment catalog value matching a first enrichment memory graph node value of the set of enrichment memory graph node values is stored in the enrichment catalog, dynamically build a first virtual enrichment catalog record including the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value, wherein the first virtual enrichment catalog is built in volatile memory; and
wherein the multi-model datastore manager is further configured to:
   return a query result including a full sequential chain of enrichments comprising at least a representation of the first virtual enrichment catalog record and a representation of the third enrichment catalog record comprising the first matching enrichment catalog value, wherein the third enrichment catalog record in the query result includes a full sequential chain of enrichments to a first source raw data record and a first source raw data field corresponding to the first matching enrichment catalog value.

5. The system of claim 4, wherein the full sequential chain of enrichments to a first source raw data record and first source raw data field corresponding to the first matching enrichment catalog value includes:
   an identifier of the source raw datastore collection, an identifier of a corresponding source raw data record, an identifier a corresponding source raw data field, and an identifier of an enrichment function for generating the first matching enrichment catalog value based on the value of the corresponding source raw data field.

6. The system of claim 4, wherein the virtual enrichment catalog constructor is further configured to:
   in response to a determination that a second enrichment catalog value matching a second enrichment memory graph node value of the set of enrichment memory graph node values is stored in the enrichment catalog, dynamically build a second virtual enrichment catalog record including the initial search value, an identifier of a fourth enrichment catalog record storing the second matching enrichment catalog value, an identifier of a source raw datastore collection associated with the fourth enrichment catalog record, and an enrichment function for searching the enrichment memory graph based on the second matching enrichment catalog value; and wherein the multi-model datastore manager is further configured to:
return the second virtual enrichment catalog record in the query result in a full sequential chain of enrichments with a representation of the fourth enrichment catalog record comprising the second matching enrichment catalog value, the fourth enrichment catalog record including a full sequential chain of enrichments to a second source raw data record and a second source raw data field corresponding to the second matching enrichment catalog value.

7. The system of claim 4, wherein the first enrichment memory graph node value comprises:
the matching enrichment memory graph node value,
an enrichment memory graph node value having an edge relationship to the matching enrichment memory graph node value, or
an enrichment memory graph node value having an inferred edge relationship to the matching enrichment memory graph node value in the enrichment memory graph.

8. The system of claim 4, wherein:
one or both of the first raw data value and the first enriched data value comprise a numerical value; and
an edge relationship or inferred edge relationship between the enrichment memory graph node value matching the initial search value and an enrichment memory graph node value of the set of enrichment memory graph node values is based on a relationship other than a term translation.

9. The system of claim 1, wherein node entries and edge relationship entries in the enrichment memory graph are configurable based on user input.

10. A computer-implemented method for maintaining provenance and lineage across a persistent multi-model datastore with uniform representation of enrichments, the method comprising:
receiving a first raw data value from a source raw datastore and a first enrichment type for the first raw data value;
querying an enrichment memory graph of the persistent multi-model datastore for a data value matching the first raw data value and having an association to the first enrichment type in the enrichment memory graph;
in response to determining that a data value matching the first raw data value and having an association to the first enrichment type is not registered in the enrichment memory graph, generating a first enriched data value by executing an enrichment function of the first enrichment type on the first raw data value;
registering a node for the first raw data value and a node for the first enriched data value in the enrichment memory graph;
creating an edge relationship between the first raw data value node and the first enriched data value node in the enrichment memory graph based on the first enrichment type; and
building a first enrichment catalog record in an enrichment catalog stored in the persistent multi-model datastore including the first enriched data value, an identifier of the enrichment function of the first enrichment type, and a respective identifier for each of a source collection, a first source record, and a first source field storing the first raw data value in the source raw datastore.

11. The method of claim 10, further comprising:
receiving a second raw data value from the source raw datastore and a second enrichment type for the second raw data value;
in response to determining that a data value matching the second raw data value and having an association to the second enrichment type is registered in the enrichment memory graph, returning the matching data value with the associated second enrichment type, and
building a second enrichment catalog record including the data value matching the second raw data value and an identifier of an enrichment function indicating an enrichment memory graph lookup process for the second raw data value having an association to the second enrichment type.

12. The method of claim 10, further comprising:
inferring an edge relationship between the first enriched data value node and an intermediate node having an edge relationship to the first raw data value node in the persisted enrichment memory graph,
wherein the inferred edge relationship is based on a combination of (1) the edge relationship between the first raw data value node and the first enriched data value node and (2) an edge relationship between the first raw data value node and the intermediate node.

13. The method of claim 10, further comprising:
receiving an initial search value in a query for generating query results from the persistent multi-model datastore;
identifying an enrichment memory graph node having a value matching the initial search value;
determining a set of enrichment memory graph node values that includes at least the enrichment memory graph node value matching the initial search value and any enrichment memory graph node value having an edge relationship or an inferred edge relationship to the matching enrichment memory graph node value;
searching the enrichment catalog for each enrichment memory graph node value of the set of enrichment memory graph node values;
in response to finding a first enrichment catalog value matching a first enrichment memory graph node value of the set of enrichment memory graph node values, dynamically building a first virtual enrichment catalog record including the initial search value, an identifier of a third enrichment catalog record storing the first matching enrichment catalog value, an identifier of a source raw datastore collection associated with the third enrichment catalog record, an identifier of the first matching enrichment catalog value, and an enrichment function for searching the enrichment memory graph based on the first matching enrichment catalog value; and
returning a query result including a full sequential chain of enrichments comprising at least a representation of the first virtual enrichment catalog record and a representation of the third enrichment catalog record comprising the first matching enrichment catalog value, wherein the third enrichment catalog record in the query result includes a full sequential chain of enrichments to a first source raw data record and a first source raw data field corresponding to the first matching enrichment catalog value.

14. The method of claim 13, wherein the full sequential chain of enrichments to a first source raw data record and a first source raw data field corresponding to the first matching enrichment catalog value includes:

an identifier of the source raw datastore collection, an identifier of a corresponding source raw data record, an identifier a corresponding source raw data field, and an identifier of an enrichment function for generating the first matching enrichment catalog value based on the value of the corresponding source raw data field.

15. The method of claim 13, further comprising:

in response to finding a second enrichment catalog value matching a second enrichment memory graph node value of the set of enrichment memory graph node values, dynamically building a second virtual enrichment catalog record including the initial search value, an identifier of a fourth enrichment catalog record storing the second matching enrichment catalog value, an identifier of a source raw datastore collection associated with the fourth enrichment catalog record, and an enrichment function for searching the enrichment memory graph based on the second matching enrichment catalog value; and returning the second virtual enrichment catalog record in the query result in a full sequential chain of enrichments with a representation of the fourth enrichment catalog record comprising the second matching enrichment catalog value, the fourth enrichment catalog record in the query result including a full sequential chain of enrichments to a second source raw data record and a second source raw data field corresponding to the second matching enrichment catalog value.

16. The method of claim 13, wherein the first enrichment memory graph node value comprises:

the matching enrichment memory graph node value, an enrichment memory graph node value having an edge relationship to the matching enrichment memory graph node value, or an enrichment memory graph node value having an inferred edge relationship to the matching enrichment memory graph node value in the enrichment memory graph.

17. The method of claim 13, wherein:

one or both of the first raw data value and the first enriched data value comprise a numerical value; and an edge relationship or inferred edge relationship between the enrichment memory graph node value matching the initial search value and an enrichment memory graph node value of the set of enrichment memory graph node values is based on a relationship other than a term translation.

18. The method of claim 10, wherein entries in the enrichment memory graph are configurable based on user input.

19. A computer-readable storage medium having program code recorded thereon that when executed by at least one processor causes the at least one processor to perform a method, the method comprising:

receiving a first raw data value from a source raw datastore and a first enrichment type for the first raw data value;

querying an enrichment memory graph of the persistent multi-model datastore for a data value matching the first raw data value and having an association to the first enrichment type in the enrichment memory graph;

in response to determining that a data value matching the first raw data value and having an association to the first enrichment type is not registered in the enrichment memory graph, generating a first enriched data value by executing an enrichment function of the first enrichment type on the first raw data value;

registering a node for the first raw data value and a node for the first enriched data value in the enrichment memory graph;

creating an edge relationship between the first raw data value node and the first enriched data value node in the enrichment memory graph based on the first enrichment type; and building a first enrichment catalog record in an enrichment catalog stored in the persistent multi-model datastore including the first enriched data value, an identifier of the enrichment function of the first enrichment type, and a respective identifier for each of a source collection, a first source record, and a first source field storing the first raw data value in the source raw datastore.

20. The computer-readable storage medium of claim 19, wherein the method further comprises:

receiving an initial search value in a query for generating query results from the persistent multi-model datastore;

identifying an enrichment memory graph node having a value matching the initial search value;

determining a set of enrichment memory graph node values that includes at least the enrichment memory graph node value matching the initial search value and any enrichment memory graph node value having an edge relationship or an inferred edge relationship to the matching enrichment memory graph node value;

searching the enrichment catalog for each enrichment memory graph node value of the set of enrichment memory graph node values;

in response to finding a first enrichment catalog value matching a first enrichment memory graph node value of the set of enrichment memory graph node values, dynamically building a first virtual enrichment catalog record including the initial search value, an identifier of a second enrichment catalog record storing the first matching enrichment catalog value, an identifier of a source raw datastore collection associated with the second enrichment catalog record, an identifier of the first matching enrichment catalog value, and an enrichment function for searching the enrichment catalog based on the first matching enrichment catalog value; and returning a query result including a full sequential chain of enrichments comprising at least a representation of the first virtual enrichment catalog record and a representation of the second enrichment catalog record comprising the first matching enrichment catalog value, wherein the second enrichment catalog record in the query result includes a full sequential chain of enrichments to a first source raw data record and a first source raw data field corresponding to the first matching enrichment catalog value.

* * * * *